US010229705B2

(12) United States Patent
Biskeborn et al.

(10) Patent No.: US 10,229,705 B2
(45) Date of Patent: Mar. 12, 2019

(54) SHORTING TOLERANT TUNNEL VALVE HEAD AND CIRCUIT

(71) Applicant: International Business Machines Corporation, Armonk, NY (US)

(72) Inventors: Robert G. Biskeborn, Hollister, CA (US); W. Stanley Czarnecki, Palo Alto, CA (US); Jason Liang, Campbell, CA (US); Calvin S. Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/414,506

(22) Filed: Jan. 24, 2017

(65) Prior Publication Data

US 2018/0211684 A1 Jul. 26, 2018

(51) Int. Cl.
G11B 5/39 (2006.01)

(52) U.S. Cl.
CPC .......... *G11B 5/3948* (2013.01); *G11B 5/3909* (2013.01); *G11B 5/3912* (2013.01); *G11B 5/3932* (2013.01); *G11B 5/3951* (2013.01); *G11B 5/3958* (2013.01)

(58) Field of Classification Search
CPC ... G11B 5/3909; G11B 5/3958; G11B 5/3932; G11B 5/3951
USPC .............................................. 360/316, 324.2
See application file for complete search history.

(56) References Cited

U.S. PATENT DOCUMENTS

| 6,178,074 | B1 | 1/2001 | Gill | |
| 6,741,433 | B1 | 5/2004 | Nishioka | |
| 7,842,334 | B2* | 11/2010 | Wakui | B82Y 25/00 360/314 |
| 8,202,572 | B2* | 6/2012 | Zhao | H01F 41/307 360/324.2 |
| 8,289,662 | B2* | 10/2012 | Iben | G01R 33/098 257/421 |
| 8,576,519 | B1* | 11/2013 | Carey | G11B 5/3929 360/324 |
| 8,908,334 | B1* | 12/2014 | Gebreselasie | G01R 33/0052 257/173 |
| 8,988,835 | B1 | 3/2015 | Biskeborn et al. | |
| 9,001,463 | B2* | 4/2015 | Biskeborn | G11B 5/0083 360/121 |
| 9,214,172 | B2 | 12/2015 | Li et al. | |

(Continued)

OTHER PUBLICATIONS

Childress, J. R. et al., "Low-Resistance IrMn and PtMn Tunnel Valves for Recording Head Applications," Journal of Applied Physics, vol. 89, Issue: 11, (abstract only), Jun. 1, 2001, pp. 1-2.

*Primary Examiner* — Jefferson Evans
(74) *Attorney, Agent, or Firm* — Zilka-Kotab, P.C.

(57) ABSTRACT

In one general embodiment, an apparatus includes a magnetic head having at least one tunneling magnetoresistance sensor. The resistance of the tunnel barrier of each tunneling magnetoresistance sensor is about 25 ohms or less. In another general embodiment, an apparatus includes a magnetic head having at least one tunneling magnetoresistance sensor. The resistivity of the tunnel barrier of each tunneling magnetoresistance sensor is less than a product of a target resistance of the tunnel barrier and an area of the tunnel barrier. The target resistance is about 25 ohms or less.

21 Claims, 13 Drawing Sheets

(56) References Cited

U.S. PATENT DOCUMENTS

| | | | |
|---|---|---|---|
| 2001/0021537 A1* | 9/2001 | Shimazawa | B82Y 10/00 438/3 |
| 2003/0021072 A1* | 1/2003 | Hayakawa | B82Y 10/00 360/324.2 |
| 2004/0075955 A1* | 4/2004 | Ryan | B82Y 10/00 360/323 |
| 2007/0097560 A1* | 5/2007 | Karr | B82Y 10/00 360/324.2 |
| 2008/0182133 A1* | 7/2008 | Shiimoto | B82Y 10/00 428/811.2 |
| 2009/0168213 A1* | 7/2009 | Araki | G11B 5/455 360/31 |
| 2010/0073828 A1* | 3/2010 | Wang | B82Y 10/00 360/324.12 |
| 2016/0093320 A1* | 3/2016 | Aria | G11B 5/455 369/53.38 |
| 2016/0211440 A1* | 7/2016 | Siddik | H01L 43/08 |
| 2016/0319419 A1* | 11/2016 | He | G11B 5/3909 |

\* cited by examiner

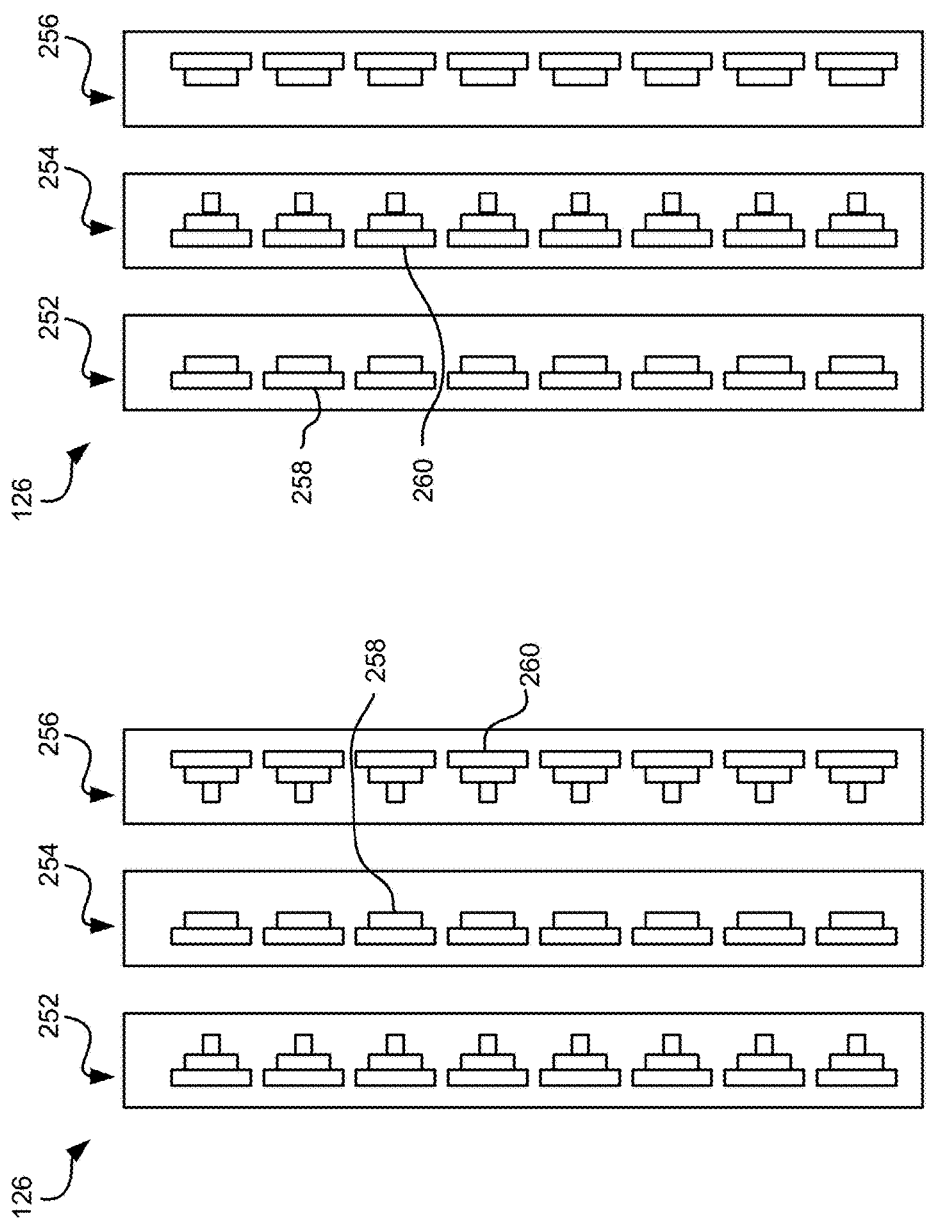

FIG. 10A  FIG. 10B

SHORTING TOLERANT TUNNEL VALVE HEAD AND CIRCUIT

BACKGROUND

The present invention relates to data storage systems, and more particularly, this invention relates to magnetic heads, e.g. magnetic tape heads, which include tunnel magnetoresistance sensors.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

SUMMARY

An apparatus according to one embodiment includes a magnetic head having at least one tunneling magnetoresistance sensor. The resistance of the tunnel barrier of each tunneling magnetoresistance sensor is about 25 ohms or less.

An apparatus according to another embodiment includes a magnetic head having at least one tunneling magnetoresistance sensor. The resistivity of the tunnel barrier of each tunneling magnetoresistance sensor is less than a product of a target resistance of the tunnel barrier and an area of the tunnel barrier. The target resistance is about 25 ohms or less.

An apparatus according to another embodiment includes a magnetic head having at least one tunneling magnetoresistance sensor. The stripe height of the tunnel barrier of each tunneling magnetoresistance sensor is greater than a quotient of a resistivity of the tunnel barrier divided by a product of a track width of the tunnel barrier and a target resistance of the tunnel barrier. The target resistance is about 25 ohms or less.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a partial tape bearing surface view of a magnetic head having a write-read-write configuration.

FIG. 4 is a partial tape bearing surface view of a magnetic head having a read-write-read configuration.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, an apparatus includes a magnetic head having at least one tunneling magnetoresistance sensor. The resistance of the tunnel barrier of each tunneling magnetoresistance sensor is about 25 ohms or less.

In another general embodiment, an apparatus includes a magnetic head having at least one tunneling magnetoresistance sensor. The resistivity of the tunnel barrier of each tunneling magnetoresistance sensor is less than a product of a target resistance of the tunnel barrier and an area of the tunnel barrier. The target resistance is about 25 ohms or less.

In yet another general embodiment, an apparatus includes a magnetic head having at least one tunneling magnetoresistance sensor. The stripe height of the tunnel barrier of each tunneling magnetoresistance sensor is greater than a quotient of a resistivity of the tunnel barrier divided by a product of a track width of the tunnel barrier and a target resistance of the tunnel barrier. The target resistance is about 25 ohms or less.

Figure 1A:
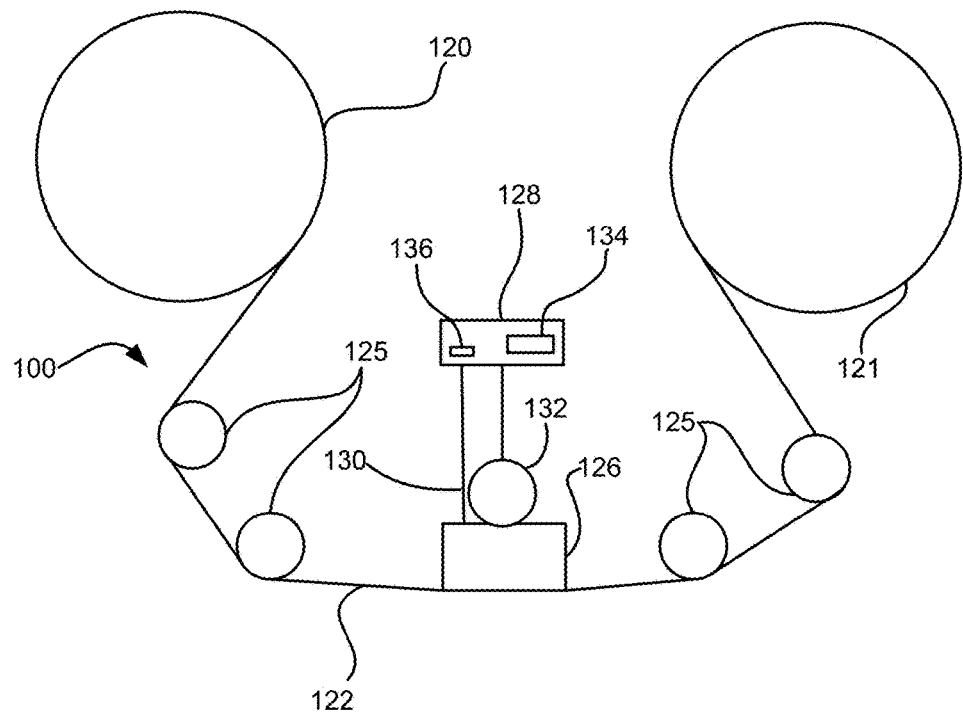
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128 may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
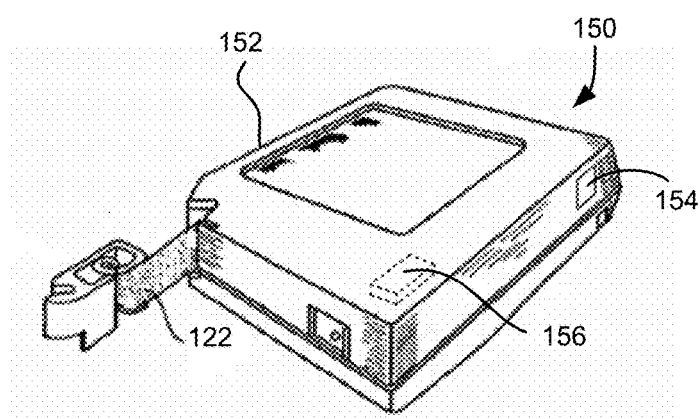
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
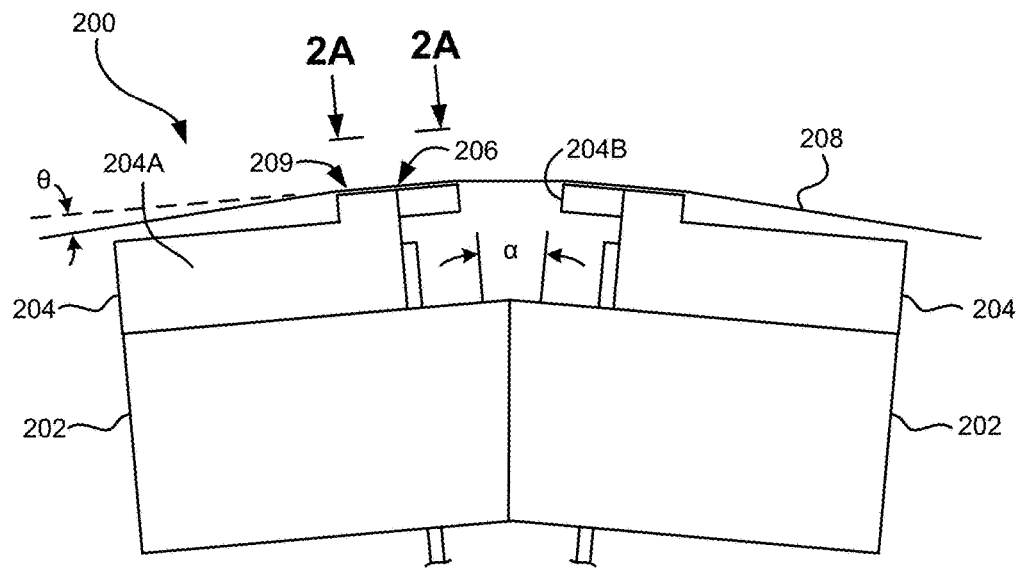
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
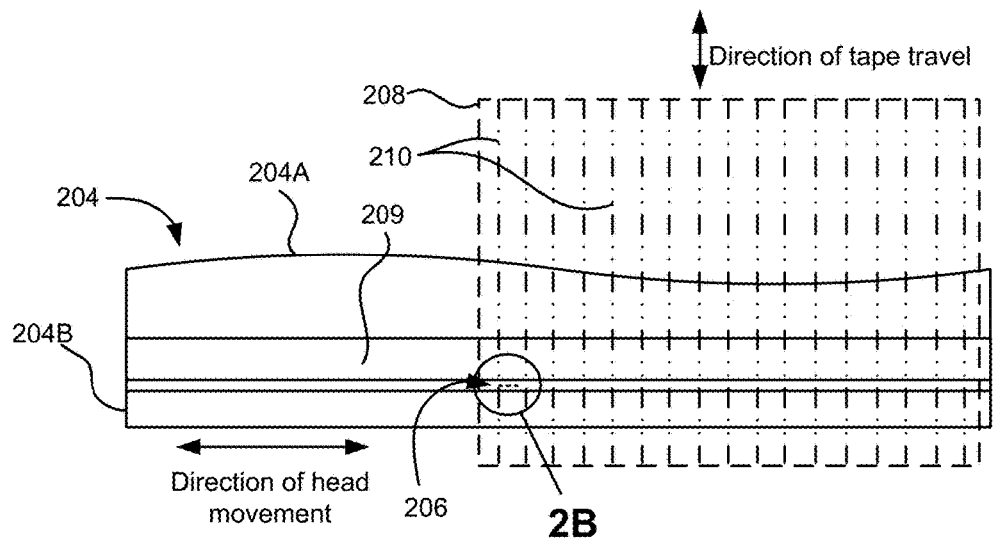
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
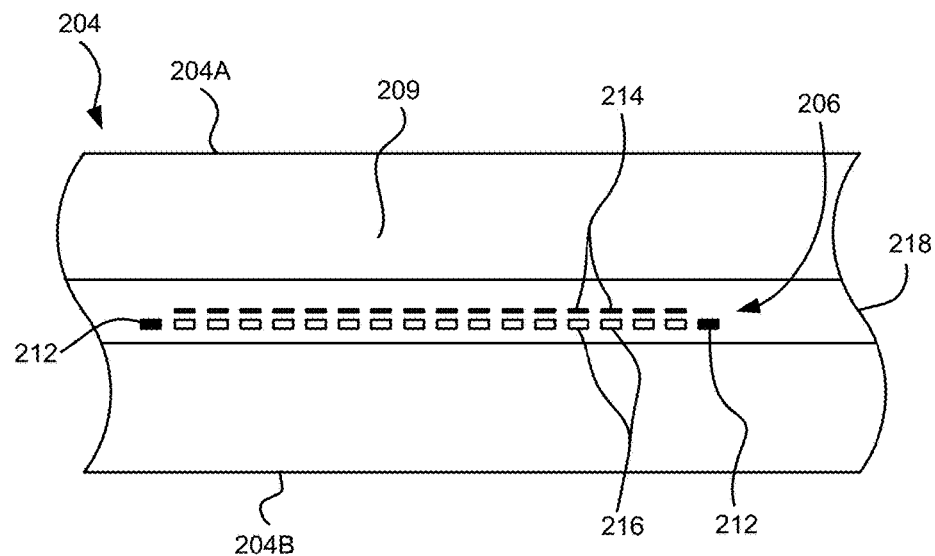
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
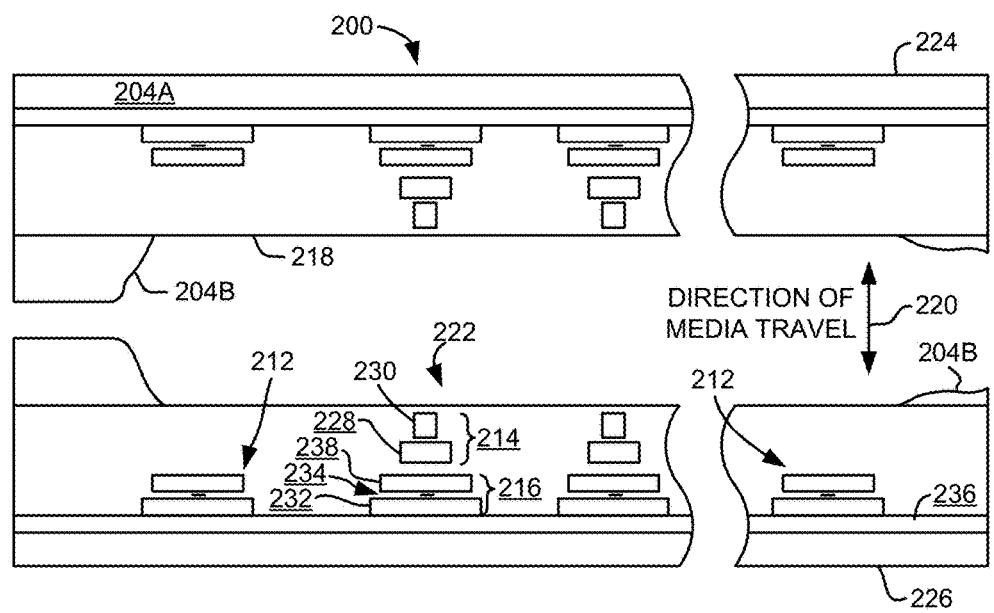
FIG. 2C is a detailed view of a partial tape bearing surface of a pair of modules.

FIG. 2C shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (—), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
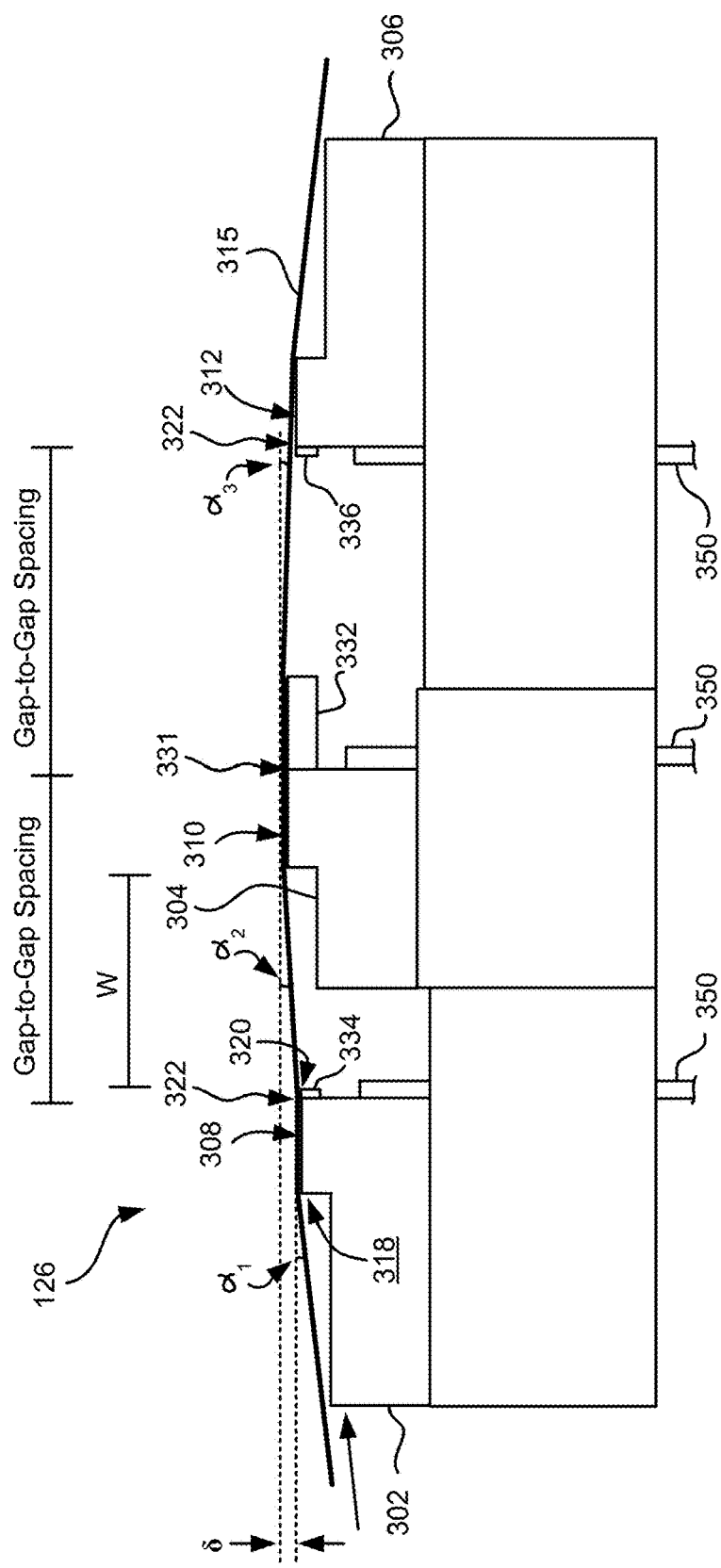
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also, note that the outer modules 302, 306 will alternate as leading modules, depending on the direction of travel of the tape 315.

Figure 6:
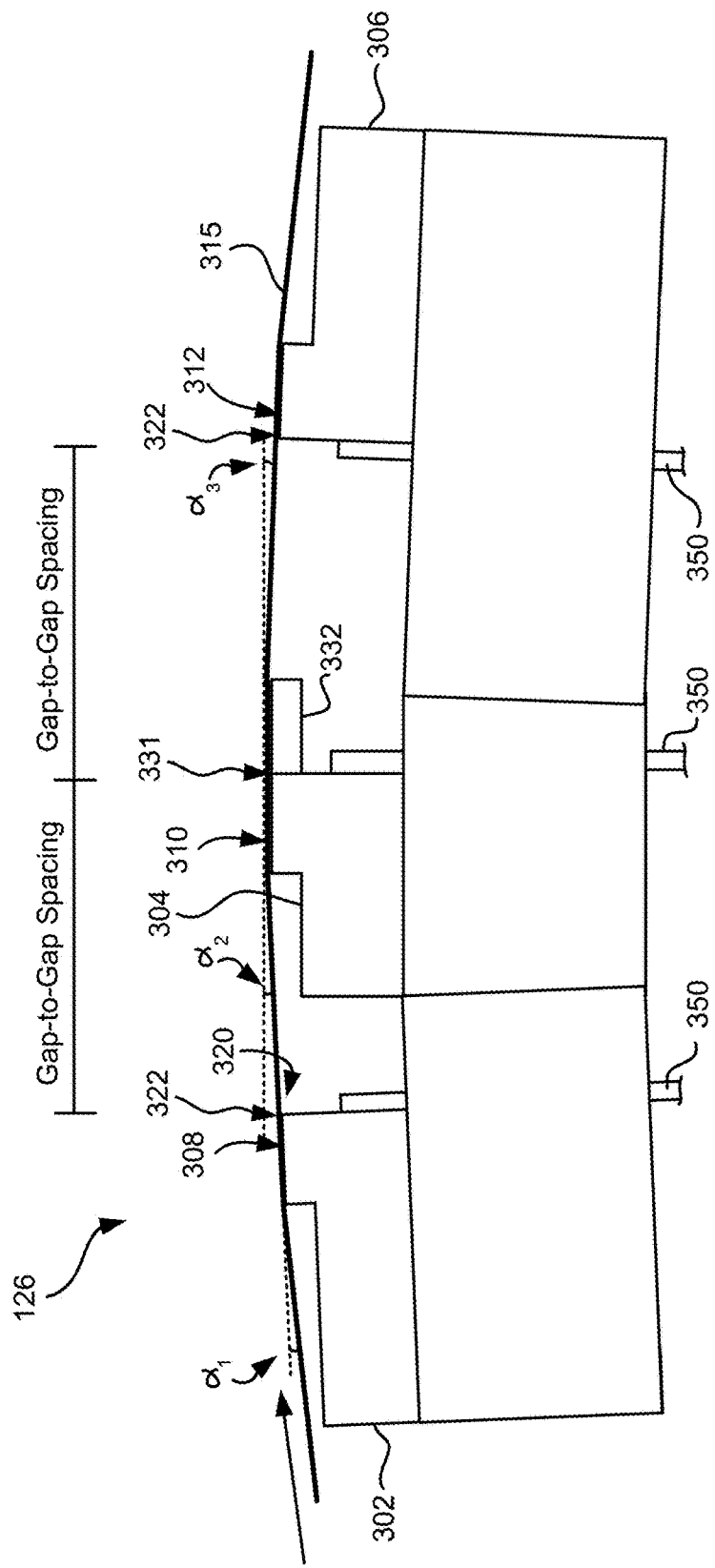
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle α2 over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}$ ($\delta$/W) where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
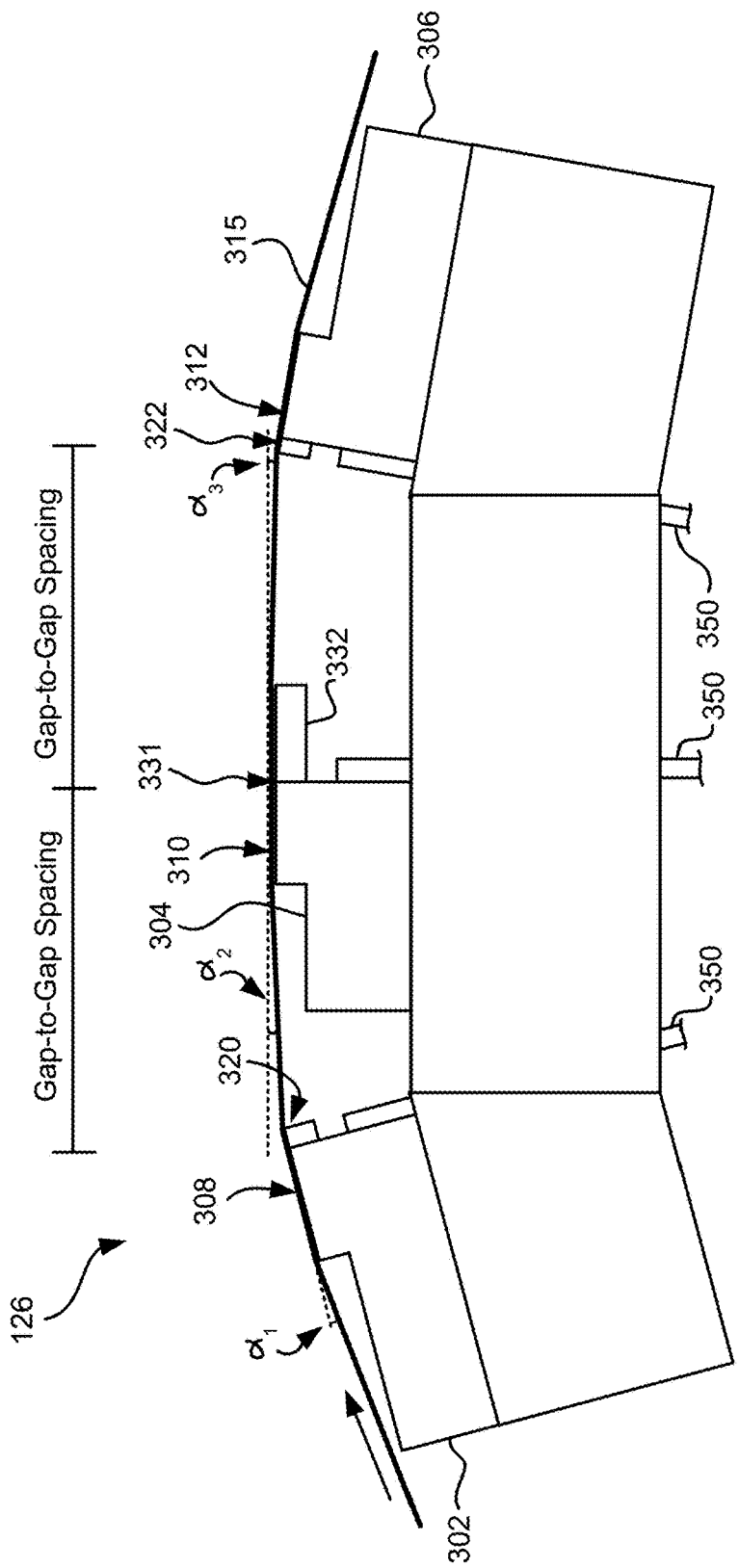
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

With continued reference to the above described apparatuses, it would be advantageous for tape recording heads to include TMR sensor technology. Furthermore, with the continual decrease in data track width in magnetic storage technologies, TMR sensors enable readback of data in ultra-thin data tracks due to their high level of sensitivity in such small operating environments.

As will be appreciated by one skilled in the art, by way of example, TMR is a magnetoresistive effect that occurs with a magnetic tunnel junction. TMR sensors typically include two ferromagnetic layers separated by a thin insulating barrier layer. If the barrier layer is thin enough e.g., less than about 15 angstroms, electrons can tunnel from one ferromagnetic layer to the other ferromagnetic layer, passing through the insulating material and thereby creating a current. Variations in the current, caused by the influence of external magnetic fields from a magnetic medium on the free ferromagnetic layer of the TMR sensor, correspond to data stored on the magnetic medium.

In tape recording, friction between asperities on the tape and the ductile metallic films in the sensor gives rise to deformation forces in the direction of tape motion. As a result, an electrical short may be created by the scratching and/or smearing across the layers which has a net effect of creating bridges of conductive material across the sensor. Particularly, the asperities tend to plow through ductile magnetic material, e.g., from one or both shields, smearing the metal across the insulating material, and thereby creating an electrical short that reduces the effective resistance of the sensor and diminishes the sensitivity of the sensor as a whole. Thus, if one or more sensors in a multichannel tape head are rendered non-functional, then tape drive cartridge capacity may be diminished.

Those familiar with TMR sensor technology would expect that a TMR sensor might experience shorting in a contact recording environment such as magnetic tape data storage due to abrasive asperities embedded in the recording medium scraping across the thin insulating layer during tape travel, thereby creating the aforementioned shorting. The inventors have, in fact, observed the tendency of such shorting occurrences.

Typical TMR sensors in hard disk drive applications are configured to be in electrical contact with the top and bottom shields of read head structures. In such configurations, the current flow is constrained to traveling between the top shield and the bottom shield through the sensor, by an insulator layer with a thickness of about 3 to about 100 nanometers (nm) proximate to the sensor stack, and thicker further away. This insulator layer extends below the hard bias magnet layer to insulate the bottom of the hard bias magnet from the bottom shield/lead layers, and isolates the edges of the sensor from the hard bias magnet material. In a tape environment, where the sensor is in contact with the tape media, smearing of the bottom shield material and/or the hard bias magnet material may bridge the insulation layer separating the hard bias magnet from the lower shield (bottom lead), thereby shorting the sensor. Further, sensor and/or shield deformation or smearing may create a conductive bridge across a tunnel barrier layer in a TMR sensor. Such tunnel barrier layer may be only 12 angstroms wide or less.

In disk drives, conventional TMR sensor designs are acceptable because there is minimal contact between the head and the media. However, for tape recording, the head and the media are in constant contact. Head coating has been cited as a possible solution to these shorting issues; however, tape particles and asperities have been known to scratch through and/or wear away these coating materials as well. Because the tunnel barrier layer of a conventional TMR sensor is extremely thin, there is a propensity for electrical shorting due, e.g., to scratches, material deposits, surface defects, films deformation, etc.

Factory pre-recession of the delicate transducers in the recording gap has been suggested to protect against shorting, however the recession adds to the recording gap.

Embodiments described herein implement a novel structure, namely a low resistance sensor and the method to adjust the resistance thereof. As a result, some of the embodiments described herein may reduce the impact of surface smears, and thus reduce the extent of shorting in the most common areas where shorting has been observed.

The potential use of TMR sensors in tape heads has heretofore been thought to be highly questionable, as tape heads include multiple sensors, e.g., 16, 32, 64, etc., on a single die. If one or more of those sensors become inoperable due to the aforementioned shorting, the head may not be able to function properly and would need to be replaced for proper operation of the apparatus.

The inventors discovered an unexpected and surprising result during testing of specially prepared tunnel valve tape heads. The parallel resistances observed on shorted sensors are typically only a few 10 s of ohms and rarely drop to a very, very low value, such as 10 ohms. More specifically, the parallel resistances on shorted sensors are observed to occur in the range of 20 to 300 ohms, and rarely less than that range. While the precise mechanism is not known and without wishing to be bound by any theory, the inventors believe that the shorts are not worse than observed is because the pre-recession process tends to reduce the extent of metallic smearing. Regardless, the resistance of the head drops during a short because current no longer flows solely through the non-shorted part of the sensor, but instead some of the current is diverted through the short. Thus, the current may provide less signal because some of the current is no longer passing through the sensor, thereby causing the amplitude to drop. However, a surprising observation is that the drop in amplitude in TMR heads tends not to be intermittent, not noisy as typically seen in a poor contact.

Contrary to conventional magnetic head designs, the inventors determined that lowering the tunnel barrier resistivity of TMR tape heads to very low resistivity, limited by self-heating, tends to mitigate the effects of surface shorting. Because the inventive sensors described herein operate at a lower resistivity than conventional TMR designs, there is less of a drop in resistance across the sensor when a short occurs, compared to a conventional head in which the resistance is much higher, and thus the drop in resistance is a significant percent of total resistance of the head.

Figures 8A, 8C:
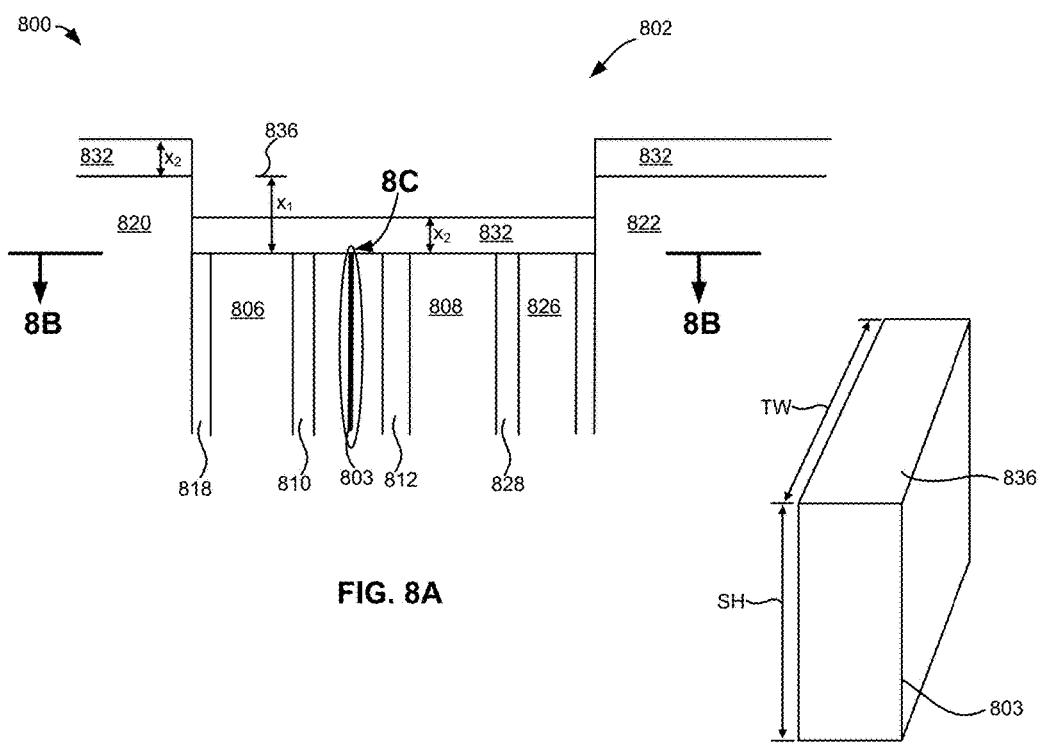
FIG. 8A is a partial side view of an apparatus according to one embodiment.
FIG. 8C is a detailed view of the tunnel barrier taken from Circle 8C of FIG. 8A.
Figure 8B:
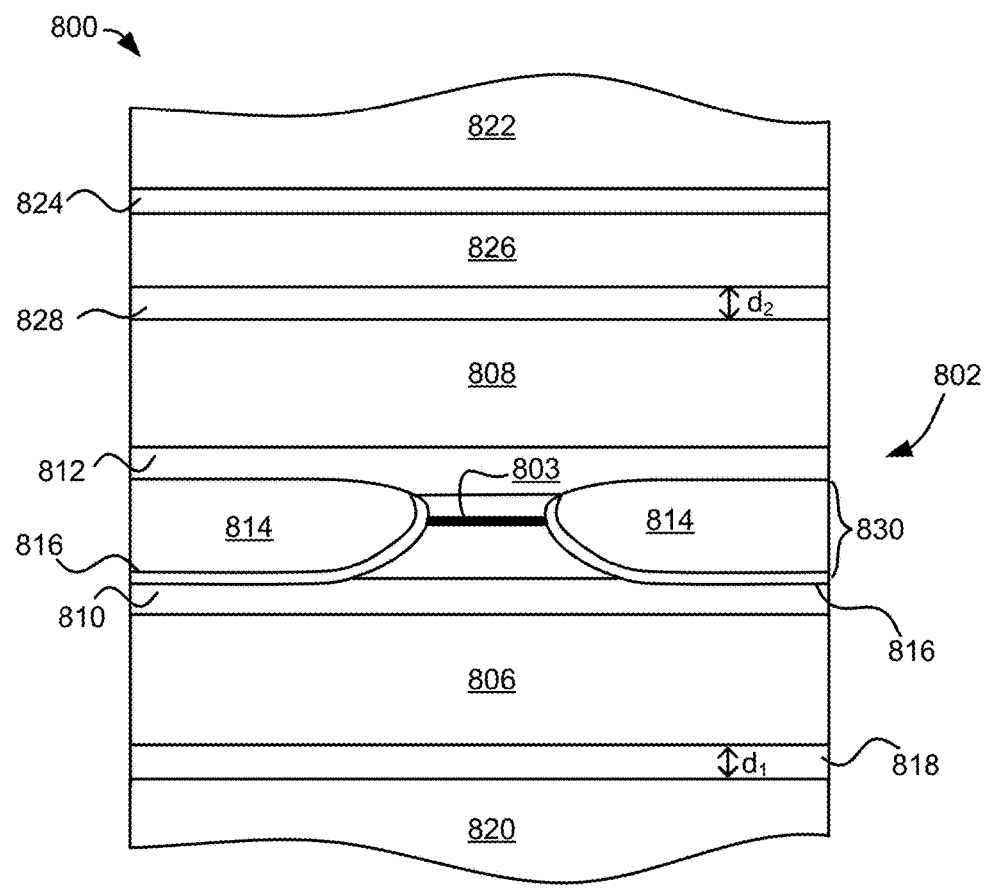
FIG. 8B is a partial cross-sectional view taken from Line 8B-8B of FIG. 8A.

FIGS. 8A-C depict an apparatus 800, in accordance with one embodiment. As an option, the present apparatus 800 may be implemented in conjunction with features from any other embodiment listed herein, such as those described with reference to the other FIGS. Of course, however, such an apparatus 800 and others presented herein may be used in various applications and/or in permutations which may or may not be specifically described in the illustrative embodiments listed herein. Further, the apparatus 800 presented herein may be used in any desired environment. Moreover, the apparatus 800 may include more or less layers than those shown in FIGS. 8A-C, depending on the embodiment.

According to one embodiment as shown in FIGS. 8A-8B, an apparatus 800 includes a magnetic head having at least one tunneling magnetoresistance (TMR) sensor 802. Preferably, the resistance of a tunnel barrier 803 of TMR sensor 802 may be about 25 ohms or less. In embodiments having multiple TMR sensors 802, the 25 ohms may be the high end of the resistance distribution across the population of sensors in the head. Other layers of each TMR sensor 802, such as the free layer, reference layer, etc. may be of conventional construction. Note that the resistance of the remaining portions of the TMR sensor 802 may be considered negligible relative to the resistance of the tunnel barrier 803.

In some approaches, where a target resistance of the tunnel barrier 803 is about 25 ohms or less, the resistivity RA of a tunnel barrier of each TMR sensor is preferably less than a product of the target resistance $R_{target}$ of the tunnel barrier and an area (track width (TW)×stripe height (SH)) of the tunnel barrier measured along the plane of deposition thereof, e.g., as illustrated in Equation 1.

$$RA < R_{target} \times (TW \times SH) \qquad \text{Equation 1}$$

In other approaches, where the target resistance is about 25 ohms or less, the stripe height SH of the tunnel barrier 803 of each TMR sensor is greater than a quotient of a resistivity RA of the tunnel barrier divided by a product of a track width TW of the tunnel barrier and a target resistance $R_{target}$ of the tunnel barrier, e.g., as illustrated in Equation 2.

$$SH > RA/(TW \times R_{target}) \qquad \text{Equation 2}$$

The apparatus 800 may include a magnetic head having a plurality of TMR sensors 802 in an array. In some approaches, the array of TMR sensors 802 may be linear. In various approaches, each sensor 802 may be configured to read a unique data track, where the sensors concurrently read the data tracks.

In the embodiment as shown in FIGS. 8A-8B, the apparatus 800 includes a magnetic head where the lower shield 806 of the sensor 802 may be formed above a wafer substrate 820, and an insulating layer 818 may be positioned between the lower shield 806 and the wafer substrate 820, where an average distance $d_1$ between the lower shield 806 and the wafer substrate 820 may be less than about 100 nm. The thin spacing may enhance heat conduction away from the sensor 802 into the wafer substrate 820, which may act as a heat sink. This in turn may enable use of higher power in the sensor 802 (power=$V^2/R$, where V is voltage and R is resistance), which in turn may enhance signal output.

In various embodiments, the sensor may include an iridium spacer between the tunnel barrier and at least one of the shields. In the apparatus 800 depicted in FIGS. 8A-8B, two iridium spacers 810, 812 are shown. The iridium spacers 810, 812 may serve to stabilize the sensor 802 and also minimize temperature rise which may result from having lower sensor resistance. Iridium is durable and has good electrical conductivity, and good thermal conductivity which may enable higher power dissipation from the TMR sensor. Thus, the iridium spacers may help remove heat and thus may also minimize temperature rise.

Moreover, the higher power provided by the lower resistance sensor may result in somewhat higher operating temperature, which may be desirable for controlling corrosion of the tape head, e.g., by preventing condensation of moisture thereon.

With continued reference to FIG. 8B, the sensor 802 may include an insulating layer 816 between each hard bias layer 814 and the TMR region. Furthermore, the tunnel barrier 803 may be a layer within the TMR region.

Referring again to FIGS. 8A-8B, the sensor 802 may include an upper layer 826 above an upper shield 808 of the sensor 802. Moreover, an insulating layer 828 may be positioned between the upper shield 808 and the upper layer 826. In some approaches, the average distance $d_2$ between the upper shield 808 and the upper layer 826 may be less than about 100 nm. Of note, the thickness of the upper layer 826 may be thicker or thinner in other embodiments. The upper layer 826 may be a layer formed above the sensor stack 830, a closure 822, etc. In one approach, the upper layer 826 may have a higher thermal conductivity than the upper shield 808. This layer 826 may assist in recovering heat from the sensor.

In some embodiments, the upper layer may have a higher hardness than the upper shield, e.g., Vickers hardness.

The sensor 802 may include a protective coating 832 on a media facing side of the sensor 802. In various approaches, at least some layers of the sensor 802 may be recessed from a plane of a media bearing surface 836 by an extent of the recession $x_1$, where the extent of recession $x_1$ plus a thickness $x_2$ of the protective coating 832 may be greater than about 10 nm ($x_1+x_2>10$ nm). In some approaches, the extent of recession $x_1$ plus the thickness $x_2$ of the protective coating may be greater than 20 nm ($x_1+x_2>20$ nm). In other approaches, the extent of recession $x_1$ plus the thickness $x_2$ of the protective coating may be greater than 30 nm ($x_1+x_2>30$ nm).

In one approach as illustrated in FIG. 8A, the TMR region of the sensor 802 including the shields 806, 808 may be recessed relative to the tape supporting portions, substrate 820 and closure 822, of the sensor 802. Furthermore, in various approaches, the sensor 802 may have a coating 832. Moreover, the coating 832 may preferably include crystalline aluminum oxide, titanium nitride, or other material.

FIG. 8C is a detailed view of the tunnel barrier 803, taken from the circle 8C of FIG. 8A. In one embodiment of the apparatus 800, a stripe height SH of the tunnel barrier 803 may be less than approximately ⅔ of a track width TW of the tunnel barrier 803. In some approaches, a relatively tall stripe height SH may be used, e.g., in the range of 0.75 to 1.25 µm for a 1.5 µm track width TW of the tunnel barrier as an example, to enable low sensor resistance.

Figure 8D:
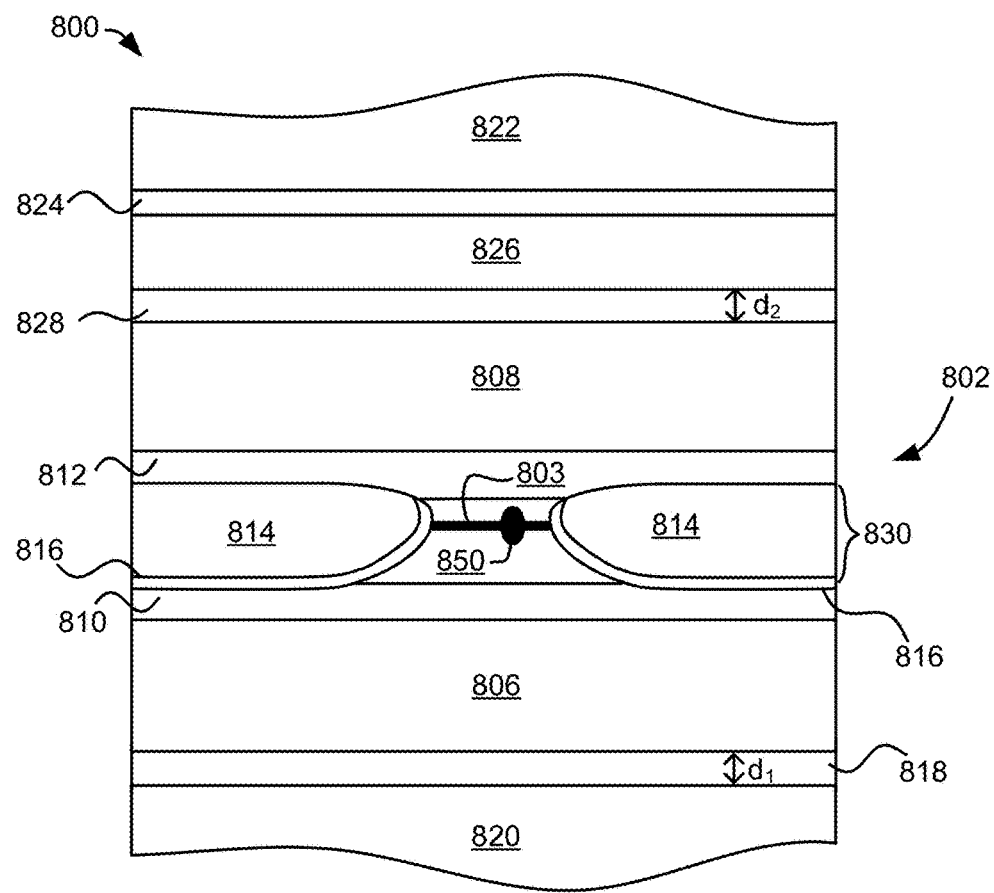
FIG. 8D depicts the view of FIG. 8B with a short across the barrier layer.
Figure 8E:
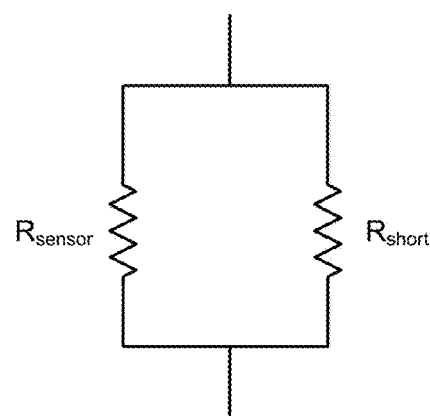
FIG. 8E depicts the equivalent circuit for the sensor of FIG. 8D with the short.

FIG. 8D depicts the sensor as shown in FIG. 8B, with a short 850 bridging the tunnel barrier 803. As noted above, the resistance of the head may drop due to the short because current no longer flows solely through the non-shorted part of the sensor, but instead some of the current is diverted through the short. FIG. 8E depicts the equivalent circuit of the sensor and short. Because the resistance of the tunnel barrier 803 is lower, the extent of signal reduction due to some of the current no longer passing through the sensor is less profound, enabling the data channel coupled to the sensor to remain operational.

Figure 9:
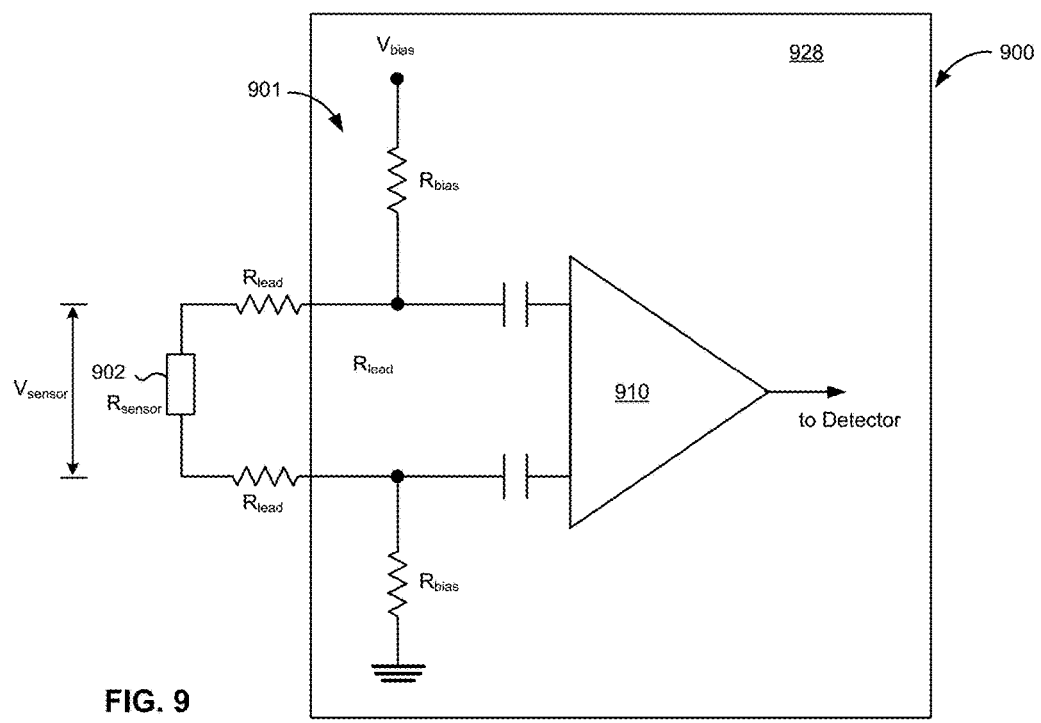
FIG. 9 is a schematic diagram of a circuit according to one embodiment.

FIG. 9 depicts an apparatus 900, in accordance with one embodiment. As an option, the present apparatus 900 may be implemented in conjunction with features from any other embodiment listed herein, such as those described with reference to the other FIGS. Of course, however, such an apparatus 900 and others presented herein may be used in various applications and/or in permutations which may or may not be specifically described in the illustrative embodiments listed herein. Further, the apparatus 900 presented herein may be used in any desired environment. Moreover, the apparatus 900 may include more or less layers than those shown in FIG. 9, depending on the embodiment.

According to one embodiment as illustrated in FIG. 9, an apparatus 900 includes a controller 928 having a biasing circuit 901, where the biasing circuit 901 sets a predetermined voltage value drop $V_{sensor}$ for the sensor 902 based on the resistance $R_{sensor}$ of the sensor 902 and other parameters of the biasing circuit 901 and leads, e.g., $R_{bias}$, $R_{lead}$, etc. In some approaches, a low resistance sensor (for example, see 802 in FIGS. 8A-8B) in combination with a biasing circuit 901 (FIG. 9) may restrict a maximum voltage drop across a thinner tunnel barrier (e.g., 803 in FIG. 8A and FIG. 8C) and thus avoid damaging the already-sensitive tunnel barrier of the sensor 902. The controller 928 may also include resistors, capacitors, a preamplifier 910, and a detector. In a preferred embodiment, V is set to achieve a target value of $V_{sensor}$ according to the following equation:

$$Vbias = \frac{2Rbias + 2Rlead + Rsensor}{Rsensor} \times Vsensor, \text{target} \quad \text{Equation 3}$$

Figure 10:
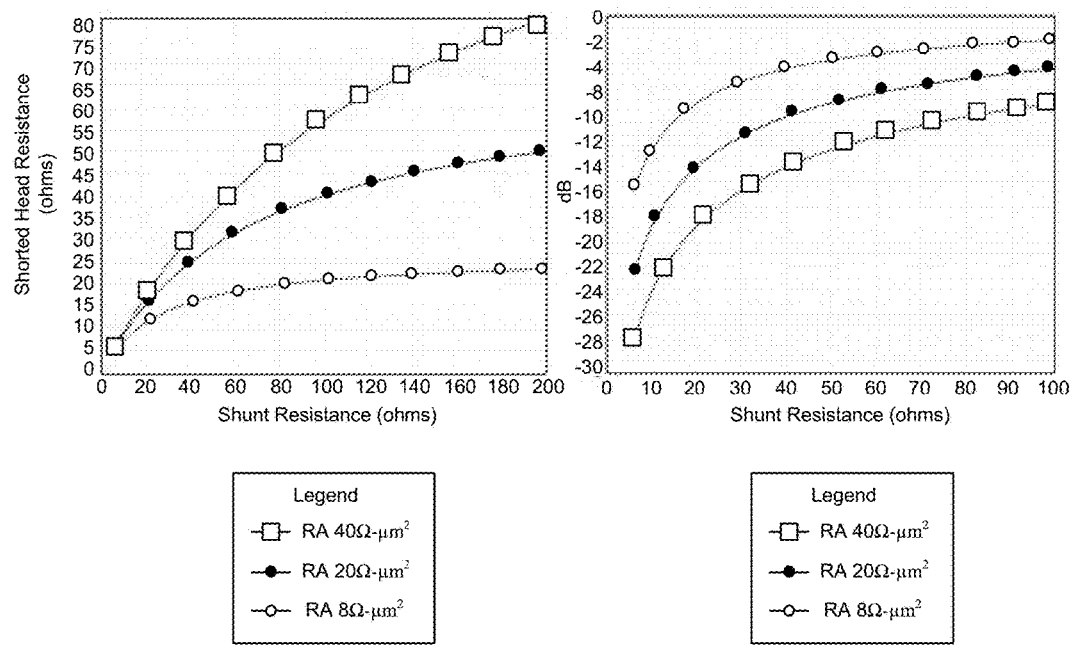
FIG. 10A is a graph of the shorted head resistance versus the shunt resistance according to one embodiment.
FIG. 10B is a graph of the loss of scaled signal output versus shunt resistance according to one embodiment.

FIGS. 10A-10B show the resistance drop in the presence of electrical shorts at the head surface of heads with three different tunnel barrier resistances expressed as resistance area (RA) product of the head. FIG. 10A is a graph of the shorted head resistance (y-axis) versus the shunt resistance (x-axis) for a 1 µm track width TMR with a 0.3 µm stripe height. The graph in FIG. 10A shows a curve of conventional head with an RA value at 40 $\Omega$-µm$^2$ (open squares), and a curve of a head with lower resistance that has a RA value at 20 $\Omega$-µm$^2$ (solid circles), and curve of a head with very low resistance that has a RA value at 8 $\Omega$-µm$^2$ (open circles). FIG. 10A shows the head with the lowest resistance (8 $\Omega$-µm$^2$, open circles) demonstrated the least drop in shorted head resistance (y-axis) as the shunt resistance (x-axis) across the head was increased. In sharp contrast, the conventional head, with a much higher resistance (40 $\Omega$-m$^2$, open squares) demonstrated a relatively high drop in shorted head resistance (y-axis) with increasing shunt resistance (x-axis).

FIG. 10B shows the loss of scaled signal output (dB, y-axis) versus shunt resistance (x-axis) for a 1 µm TMR with a 0.3 µm stripe height for the three heads that have different RA values. As shown in FIG. 10B, with increasing shunt resistance (x-axis) that causes a short in the head, the loss of amplitude output (dB, y-axis) was greater proportional to the RA value of the head, such that the greatest loss of amplitude output occurred with the conventional head (40 $\Omega$-m$^2$, open squares), less loss of amplitude output occurred with the head with an RA value of 20 $\Omega$-µm$^2$ (solid circles), and the least loss of amplitude output occurred with the head with an RA value of only 8 $\Omega$-µm$^2$ (open circles). Thus, lowering the resistance by reducing the RA value of the head lowers the drop in resistance, and in turn, may minimize the loss of signal output caused by a short during reading.

Figure 11:
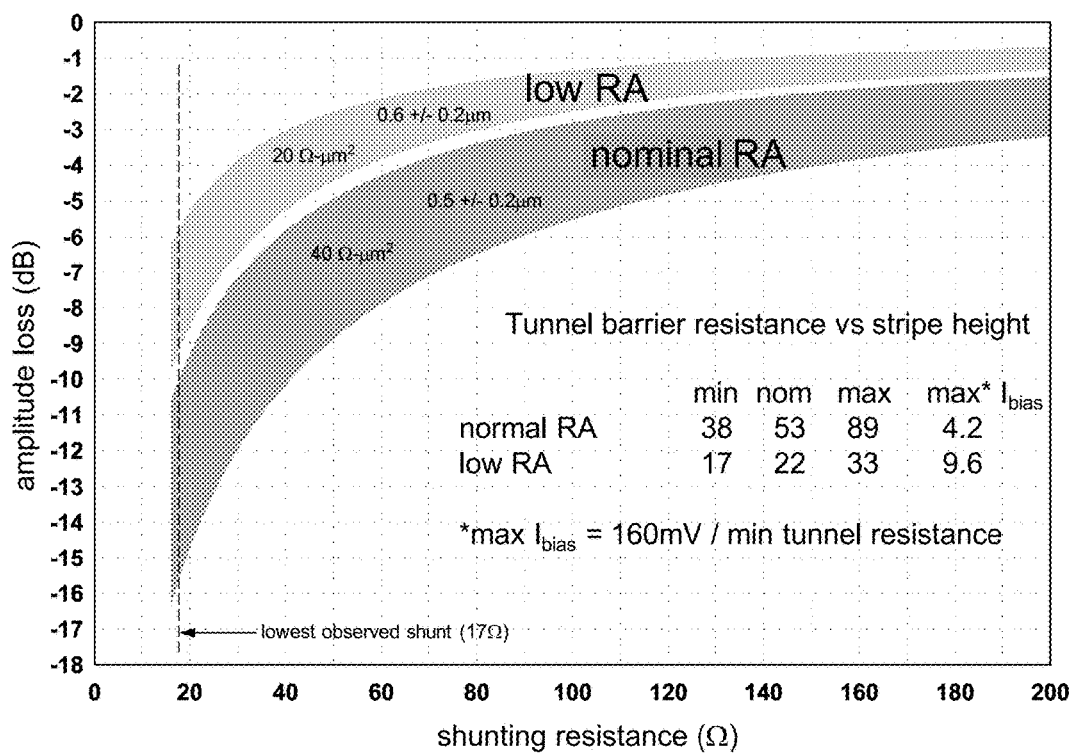
FIG. 11 is a graph of amplitude loss vs. shunt resistance for conventional TMR sensor and one embodiment of the present invention.

FIG. 11 is a graph of amplitude loss in dB vs. shunt resistance for a conventional TMR sensor and one embodiment of the present invention. This chart demonstrates the advantage of a lower resistance head. The lower resistance is achieved by providing a lower RA and a taller stripe height. Under the conditions shown in the Figure, the lower resistance head shows a maximum amplitude loss of only about 9 dB over the stripe height range in the figure, whereas a head having a nominal RA of 40 ohm-microns$^2$ and a shorter stripe height shows a maximum amplitude loss of about 16 dB, or thus more than a factor of two.

In some embodiments, the very low head resistance enables higher bandwidth operation for capacitive loading presented by CMOS preamplifiers designed for multichannel tape heads, where ASIC power dissipation may rule out bipolar chip design.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
a magnetic head having at least two tunneling magnetoresistance sensors,
wherein a resistance of a tunnel barrier of each of the tunneling magnetoresistance sensors of the magnetic head is about 25 ohms or less,
a drive mechanism for passing a magnetic medium over the magnetic head; and
a controller electrically coupled to the magnetic head,
wherein the controller includes a biasing circuit, wherein the biasing circuit sets a predetermined voltage value drop for the tunnel barrier.

2. An apparatus as recited in claim 1, wherein the tunneling magnetoresistance sensors are present in the magnetic head in an array.

3. An apparatus as recited in claim 2, wherein the array is linear.

4. An apparatus as recited in claim 1, wherein a lower shield of the sensor is formed above a wafer substrate, wherein an insulating layer is positioned between the lower shield and the wafer substrate, wherein an average distance between the lower shield and the wafer substrate is less than about 100 nm.

5. An apparatus as recited in claim 4, comprising an electrically conductive spacer between the tunnel barrier and at least one of the shields.

6. An apparatus as recited in claim 5, wherein the electrically conductive spacer comprises iridium.

7. An apparatus as recited in claim 1, comprising an upper layer above an upper shield of the sensor, wherein an insulating layer is positioned between the upper shield and the upper layer, wherein an average distance between the upper shield and the upper layer is less than about 100 nm.

8. An apparatus as recited in claim 7, wherein the upper layer has a higher thermal conductivity than the upper shield.

9. An apparatus as recited in claim 8, wherein the upper layer has a higher hardness than the upper shield.

10. An apparatus as recited in claim 1, comprising a protective coating on a media facing side of the sensor, wherein at least some layers of the sensor are recessed from a plane of a media bearing surface, wherein an extent of the recession plus a thickness of the protective coating is greater than about 10 nm.

11. An apparatus as recited in claim 1, wherein a stripe height of the tunnel barrier is at least ⅔ of a track width of the tunnel barrier or greater.

12. An apparatus as recited in claim 1, wherein the magnetic head is a tape head.

13. An apparatus, comprising:
a magnetic head having at least two tunneling magnetoresistance sensors,
wherein a resistance of a tunnel barrier of each of the tunneling magnetoresistance sensors of the magnetic head is about 25 ohms or less,
wherein the tunneling magnetoresistance sensors are present in the magnetic head in an array,
wherein each sensor is configured to read a unique data track, wherein the sensors are configured to concurrently read the data tracks.

14. An apparatus, comprising:
a magnetic head having at least two tunneling magnetoresistance sensors, wherein a plurality of tunneling magnetoresistance sensors are present in the magnetic head in an array,
wherein a resistivity of a tunnel barrier of each of the tunneling magnetoresistance sensors of the magnetic head is less than a product of a target resistance of the tunnel barrier and an area of the tunnel barrier,
wherein the target resistance is about 25 ohms or less,
wherein each sensor is configured to read a unique data track, wherein the sensors are configured to concurrently read the data tracks.

15. An apparatus as recited in claim 14, wherein the array is linear.

16. An apparatus as recited in claim 14, further comprising:
a drive mechanism for passing a magnetic medium over the magnetic head; and
a controller electrically coupled to the magnetic head.

17. An apparatus, comprising:
a magnetic head having at least one tunneling magnetoresistance sensor,
wherein a stripe height of a tunnel barrier of each tunneling magnetoresistance sensor of the magnetic head is greater than a quotient of a resistivity of the tunnel barrier divided by a product of a track width of the tunnel barrier and a target resistance of the tunnel barrier,
wherein the target resistance is about 25 ohms or less.

18. An apparatus as recited in claim 17, wherein a plurality of tunneling magnetoresistance sensors are present in the magnetic head in an array.

19. An apparatus as recited in claim 18, wherein the array is linear.

20. An apparatus as recited in claim 18, wherein each sensor is configured to read a unique data track, wherein the sensors are configured to concurrently read the data tracks.

21. An apparatus as recited in claim 17, further comprising:
a drive mechanism for passing a magnetic medium over the magnetic head; and
a controller electrically coupled to the magnetic head.

* * * * *